(12) United States Patent
Mika

(10) Patent No.: US 11,941,139 B2
(45) Date of Patent: Mar. 26, 2024

(54) APPLICATION-SPECIFIC ACCESS PRIVILEGES IN A FILE SYSTEM

(71) Applicant: Disney Enterprises, Inc., Burbank, CA (US)

(72) Inventor: Jeremy A. Mika, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 183 days.

(21) Appl. No.: 17/118,276

(22) Filed: Dec. 10, 2020

(65) Prior Publication Data
US 2022/0188436 A1 Jun. 16, 2022

(51) Int. Cl.
G06F 21/62 (2013.01)
G06F 21/31 (2013.01)
G06F 21/45 (2013.01)
G06F 21/60 (2013.01)

(52) U.S. Cl.
CPC ......... *G06F 21/6218* (2013.01); *G06F 21/31* (2013.01); *G06F 21/45* (2013.01); *G06F 21/602* (2013.01); *G06F 2221/2107* (2013.01); *G06F 2221/2111* (2013.01); *G06F 2221/2137* (2013.01); *G06F 2221/2141* (2013.01)

(58) Field of Classification Search
CPC ........ G06F 21/31; G06F 21/45; G06F 21/602; G06F 2221/2141; G06F 2221/2137; G06F 21/6218; H04L 67/1097
See application file for complete search history.

(56) References Cited

U.S. PATENT DOCUMENTS 8,239,351 B2 8/2012 Hornqvist
8,959,593 B2 2/2015 Goyal et al.
9,465,953 B2 10/2016 Sharma et al.
(Continued)

FOREIGN PATENT DOCUMENTS

CN 108683633 A 10/2018
JP 2017049811 A 3/2017

OTHER PUBLICATIONS

Locklizard, "Revoke Document Access-Revoking Document Access, document expiry and remote file deletion," <https://www.locklizard.com/revoke-document-access/> [Accessed Online Dec. 4, 2020].
(Continued)

*Primary Examiner* — Dao Q Ho
(74) *Attorney, Agent, or Firm* — Artegis Law Group, LLP

(57) ABSTRACT

Embodiments provide techniques for managing access to files on a computing system. An example method generally includes receiving, from an application, a request by a user to access a specified file on a file system through the application. A permission record is retrieved from a permission repository based on information about the application, the user, and the specified file. A determination is made of whether the user has permission to access a directory in the file system in which the specified file is located, and a determination is made of whether the application is allowed to access the specified file. Based on determining that the user has permission to access the directory in which the specified file is located and determining that the application has permission to access the specified file, the specified file is retrieved from the directory, and the application is granted access to the specified file.

20 Claims, 6 Drawing Sheets

(56) References Cited

U.S. PATENT DOCUMENTS

| | | | | |
|---|---|---|---|---|
| 2006/0129627 | A1* | 6/2006 | Phillips | H04L 63/10 709/200 |
| 2008/0306954 | A1* | 12/2008 | Hornqvist | G06F 16/168 707/999.009 |
| 2011/0191549 | A1* | 8/2011 | Lyutsarev | G06F 16/283 711/170 |
| 2011/0213971 | A1* | 9/2011 | Gurel | G06F 21/10 713/165 |
| 2012/0078968 | A1* | 3/2012 | Nixon | G06F 16/14 707/E17.055 |
| 2012/0165965 | A1* | 6/2012 | Robinson | H04L 65/80 700/94 |
| 2012/0311697 | A1* | 12/2012 | Swingler | G06F 21/6218 726/17 |
| 2013/0276067 | A1* | 10/2013 | Goyal | G06F 21/6209 726/4 |
| 2014/0033271 | A1* | 1/2014 | Barton | H04W 12/64 726/1 |
| 2016/0063272 | A1* | 3/2016 | Sharma | G06F 21/60 726/1 |
| 2016/0259811 | A1* | 9/2016 | MacKay | H04L 67/1097 |
| 2020/0196024 | A1* | 6/2020 | Hwang | H04N 21/2353 |
| 2021/0072870 | A1* | 3/2021 | Arnold | H04L 67/06 |
| 2021/0377276 | A1* | 12/2021 | Dasari | H04L 63/0853 |
| 2022/0188436 | A1* | 6/2022 | Mika | G06F 21/45 |

OTHER PUBLICATIONS

Aseem Kishore, "How to Set File and Folder Permissions in Windows," Computer Tips, Nov. 13, 2015, 20 pages.

Imar Spaanjaars, "How Do I Allow my Web Application to Write to Files, Folders and Databases," <https://imar.spaanjaars.com/290/how-do-i-allow-my-web-application-to-write-to-files-folders-and-databases> [Acessed Online Dec. 4, 2020].

Dundas Data Visualization, Inc, "Application Privileges," <https://www.dundas.com/support/learning/documentation/administration/list-of-application-privileges> [Accessed Online Dec. 4, 2020].

* cited by examiner

APPLICATION-SPECIFIC ACCESS PRIVILEGES IN A FILE SYSTEM

BACKGROUND

Field

Aspects of the present disclosure relate to file access mechanisms, and more specifically to file systems that allow applications to or disallow applications from accessing files on the file system.

Description of the Related Art

File systems generally store files on a computer system and implement permission-based access to these files stored on the computer system. On many file systems, permissions may be established globally, for specific groups of users, or for a specific user. These permissions may allow a user to read a file, but not write or overwrite the file (i.e., read-only access), read from and write to the file (i.e., read/write access), and/or execute the file (i.e., execute access, where a file includes executable code, such as a Portable Executable file, a Java applet, or other code that can be executed on a computer). When an application attempts to access a file, the file system can use information about the user of the application to determine whether to allow the application to access the file (i.e., grant access to the file) or disallow the application from accessing the file (i.e., block access to the file). In this way, file systems may generally control access to files on a per-user basis so that users are able to interact with files on the file system that they have been granted access to, but are not allowed to interact with files that they should not have access to.

While file systems may be configured to control user access to files stored on the file system, file systems may indiscriminately allow applications to access files that a user has permission to access. Allowing applications to access files based on user-level permissions may be a security problem, as some applications that access files on a file system may be malicious applications or may allow for malicious code to be executed on a computer system. For example, a web browser may include one or more components that allow for execution of arbitrary code within the web browser. Various malicious actions may be performed by applications executing on a computer, such as destroying files on the file system (e.g., in ransomware applications where files are encrypted and the user of the computer system is required to pay a fee to obtain the decryption key and regain access to the files on the file system), exfiltrating sensitive files to an external source, and the like.

SUMMARY

One embodiment described herein is a method for managing access to files on a computer file system. The method generally includes receiving, from an application, a request by a user to access a specified file on a file system through the application. A permission record is retrieved from a permission repository based on information about the application, the user, and the specified file. A determination is made of whether the user has permission to access a directory in the file system in which the specified file is located, and a determination is made of whether the application is allowed to access the specified file. Based on determining that the user has permission to access the directory in which the specified file is located and determining that the application has permission to access the specified file, the specified file is retrieved from the directory, and the application is granted access to the specified file.

Another embodiment described herein a system for managing access to files on a computer file system. The system generally includes a processor and a memory. The memory generally stores instructions which, when executed by the processor, performs an operation. The operation generally includes receiving, from an application, a request by a user to access a specified file on a file system through the application. A permission record is retrieved from a permission repository based on information about the application, the user, and the specified file. A determination is made of whether the user has permission to access a directory in the file system in which the specified file is located, and a determination is made of whether the application is allowed to access the specified file. Based on determining that the user has permission to access the directory in which the specified file is located and determining that the application has permission to access the specified file, the specified file is retrieved from the directory, and the application is granted access to the specified file.

Still another embodiment described herein is a computer-readable medium having instructions stored thereon which, when executed by a processor, performs an operation for managing access to files on a computer file system. The operation generally includes receiving, from an application, a request by a user to access a specified file on a file system through the application. A permission record is retrieved from a permission repository based on information about the application, the user, and the specified file. A determination is made of whether the user has permission to access a directory in the file system in which the specified file is located, and a determination is made of whether the application is allowed to access the specified file. Based on determining that the user has permission to access the directory in which the specified file is located and determining that the application has permission to access the specified file, the specified file is retrieved from the directory, and the application is granted access to the specified file.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

Embodiments of the present disclosure describe file access systems that use application-specific permissions and an application-specific access privilege system to control access to files on a computer file system. In one embodiment, an application-specific access privilege system can be interposed between the computer file system and applications executing on the computer system. When an application requests access to a file, the application-specific access privilege system can intercept the request and determine whether the user of the application and the application is allowed to access the file (e.g., based on the directory in which the file is stored, the type of the file the application is attempting to access and the types of files supported by the application, etc.). If the user of the application and the application has permission to access the file, the application-specific access privilege system can retrieve the file from the computer file system and return the file to the application for use. If, however, the user of the application or the application does not have permission to access the file, the application-specific access privilege system can take various actions to control access to the file. For example, the application can be blocked from accessing the file, or a user can be prompted to temporarily grant permission for the application to access the file.

By using application-specific permissions to control access to files on a computer system, embodiments described herein may protect files on a computer system from malicious applications or misuse of legitimate applications. Applications may be blocked, for example, from accessing sensitive files in specific directories, files that the application typically is not configured to handle, and the like. By controlling file and/or file directory permissions on a per-application basis, a subset of applications executing on a computer system may be granted access to files on the computer system, rather than allowing any application to access a file if the user of the application has permission to interact with the file. This may provide for finer-grained control over access to files on the computer system and may improve file security on the computer system.

Figure 1:
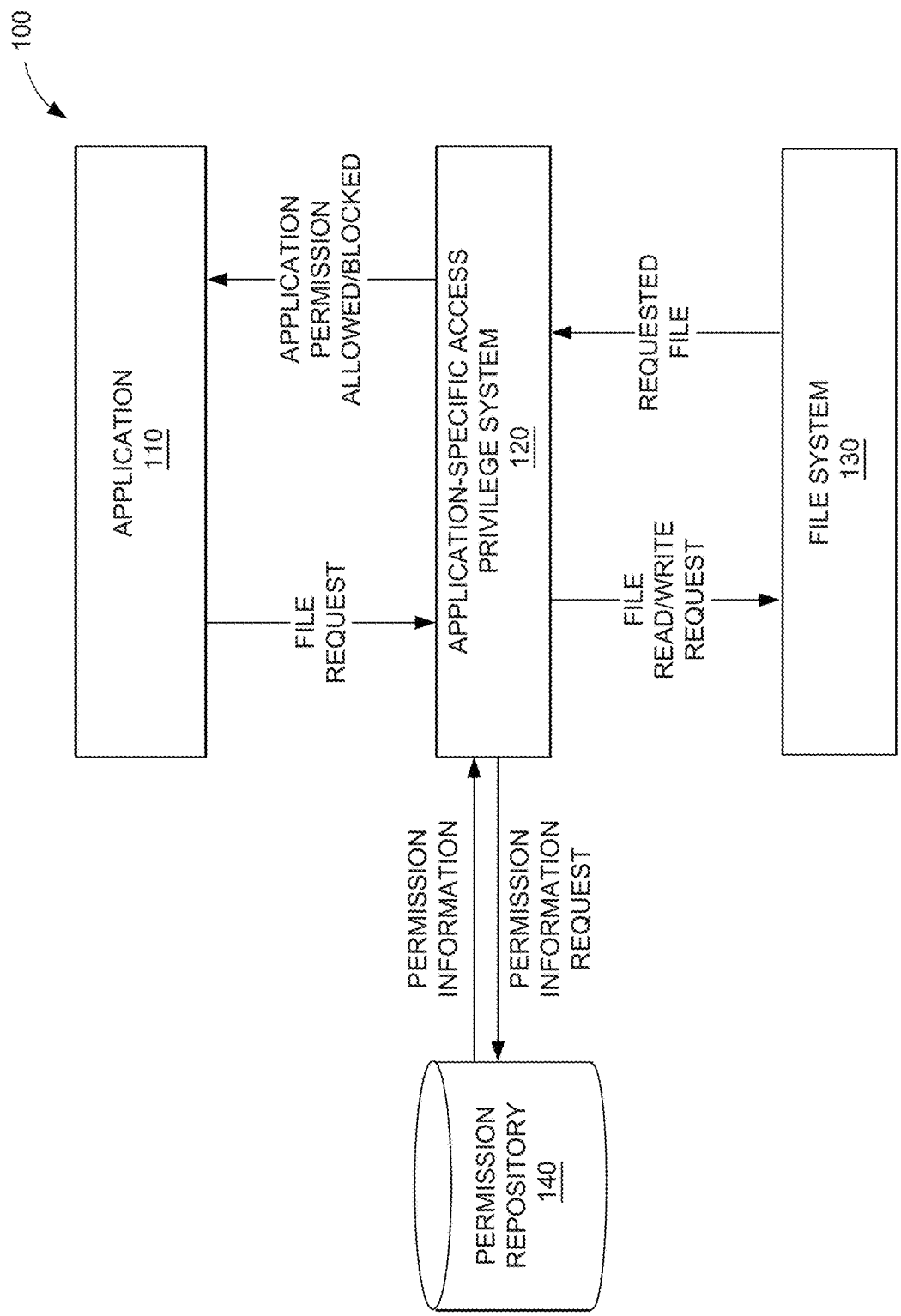
FIG. 1 illustrates a file access pipeline in which application-specific access permissions are used to control access to files on a file system, according to one embodiment described herein.

FIG. 1 illustrates a block diagram of a file access pipeline 100 in which application-specific privileges are used to control access to a file stored on a computer file system. As illustrated, file access pipeline 100 includes an application 110 that requests access to a specified file on a file system 130, an application-specific access privilege system 120 that handles requests made by the application 110 to access the specified file, the file system 130 that stores files on a computing system, and a permission repository 140.

The application 110 generally represents a user-space application that interacts with files on the computer file system. The application 110 can generate one or more requests to interact with a file on the file system 130. In response, the application 110 can receive access to the file from the file system 130 if the application 110 has been granted access to the file. If the application 110 is blocked from accessing the file, as discussed in further detail below, the application 110 can throw an error indicating that the application 110 has been blocked from accessing the file. In throwing an error, the application 110 can display an error message to a user indicating that the application 110 is blocked from accessing the file, log the failure, terminate, or take other actions that may indicate and/or record that the application 110 was blocked from accessing the file.

The application-specific access privilege system 120 generally handles requests from an application 110 to access a file using permissions defined on at least a user and application basis. In some embodiments, the application-specific access privilege system 120 may be implemented as a virtual file system layer or other interceptor that is interposed between applications executing on a computer system and the file system 130. The application-specific access privilege system 120 may interface with the file system 130 to retrieve files from and write files to directories in the file system that the user and the application are allowed to access. Because file permissions are generally handled at the application-specific access privilege system 120, the application-specific access privilege system 120 may, in some embodiments, be configured with superuser access to the file system 130 so that the application-specific access privilege system 120 can perform file operations for any user of a computer system on which the file access pipeline 100 operates. Superuser access may be, in some embodiments, restricted to non-system directories on the file system 130 so that the application-specific access privilege system 120 is not granted unlimited access to system folders including system files needed for the computer system to operate. In some embodiments, the application-specific access privilege system 120 can impersonate the user that is requesting access to a file through the application 110 so that user or group-based privileges can be applied also at the file system 130. By impersonating the user that is requesting access to a file through the application 110, security threats that may arise from malicious modifications to the application-specific access privilege system 120 may be mitigated, as the application-specific access privilege system 120 may be limited to accessing files subject to user or group-based privileges and may not have superuser access to the file system.

Generally, the application-specific access privilege system 120 receives a request from an application (e.g., the application 110) to perform an operation in respect of a file stored in a directory in file system 130. The request generally identifies a path at which the file is located and a user of the application 110. In some embodiments, using the three-tuple of the directory, the application and the user information, the application-specific access privilege system 120 requests permission information from a permission repository 140. In response, the application-specific access privilege system 120 can receive a permission record identifying the rights the user and the application have to files in the directory or a null result. If the application-specific access privilege system 120 receives a permission record associated with the three-tuple of the directory, the application, and the user, the application-specific access privilege system 120 can compare the received request to information in the permission record to determine whether to allow or block the request. For example, if the application 110 attempts to read a file, and the permission record indicates that the application 110 and the user has at least read access to the file, the application-specific access privilege system 120 can satisfy the request and return the file to the application 110. In another example, if the application 110 attempts to write to a directory, and the permission record indicates that the application 110 and the user has at least write access to the file, the application-specific access privilege system 120 can satisfy the request by writing data in the request to a specified location in the file system.

In some embodiments, the application-specific access privilege system 120 can receive a permission record indicating that the application 110 and the user has a temporary lease to access the directory or specific files therein. The temporary lease generally includes one or more expiry conditions for the lease. These expiry conditions may include, for example, an expiry time of the lease (e.g., a date and time after which the application 110 is not allowed to access files in the directory or specific files therein) or a maximum number of times the application 110 is allowed to access files in the directory or a specific file therein. The temporary lease may thus expire at the expiry time or after the maximum number of file accesses has been reached. If the lease is still valid (e.g., if the timestamp associated with the file request is before an expiry time specified in the lease, if the number of previous accesses to the directory is less than the maximum number of allowed file accesses, etc.), the application-specific access privilege system 120 can allow the application 110 to access the file. In some embodiments, where the expiry condition includes a maximum number of allowed file access attempts for the directory or for specific files in the directory, the application-specific access privilege system 120 can increment a counter associated with the privilege record to track the number of file access attempts the application 110 has made against the directory or the specific files in the directory. If an expiry condition specified in the temporary lease has been satisfied, the application-specific access privilege system 120 can block the application 110 from further accessing the directory or specific files therein. In some embodiments, the application-specific access privilege system 120 can prompt a user to extend the lease for the application. If the user extends the lease, a new privilege record can be generated reflecting the new expiry conditions for the lease.

In some embodiments, where the application-specific access privilege system 120 receives an invalid attempt to access a file, the access-specific access privilege system can generate an alert with information about the invalid attempt. The alert may be transmitted, for example, to the owner of the file subject to the invalid access attempt and/or the user of the application 110 through which an attempt to access the file was made. Various actions can be taken to block application 110 from accessing the file (and other files in the directory) or to grant temporary access to the file, as discussed in further detail below.

In some embodiments, the application-specific access privilege system 120 may include information indicating that the application 110 is blocked from accessing files in the directory. Because the application is blocked from accessing files in the directory, the application-specific access privilege system 120 can return an error to the application. The application-specific access privilege system can additionally save a record in a log file with information about the blocked file access request.

If the application-specific access privilege system 120 receives a null result from the permission repository 140, the application-specific access privilege system can determine that that no lease exists for the combination of the user, the application, and the directory. In such a case, user-based permission information at file system 130 can be used to initially determine whether to present, to a user, a prompt to grant a temporary lease to the application to access files in the directory. If file system 130 is configured such that the user does not have permission to access the directory, the application-specific access privilege system 120 can take no further action with respect to the request. Otherwise, if the user has permission to access the directory, the application-specific access privilege system 120 can generate a prompt to the user that allows the user to specify the parameters of a lease defining conditions under which the application 110 is allowed to access the file. The user-provided parameters may be combined with the user permissions for the directory in file system 130 to generate a permission record for the application evidencing the grant of a lease to the application 110.

In some embodiments, the application-specific access privilege system 120 can further verify that the application requesting access to a file is a legitimate version of the application or an unknown (and potentially maliciously modified) version of the application. The application-specific access privilege system 120 can use an identifier, such as an application signature included in the application, a hash of the application executable, or other unique identifier, and compare the identifier to a known set of identifiers associated with the application. If the identifier of the application is included in the known set of identifiers, the application-specific access privilege system 120 can determine that the application is legitimate and use the permission record associated with the application to determine whether to allow or disallow access to the file. Otherwise, the application-specific access privilege system 120 can determine that the application may have been maliciously modified. In such a case, the application-specific access privilege system can block the application from accessing the file, treat the application as an unknown application and take action based on the absence of a permission record for the application (as discussed above), or take other actions to prevent or mitigate file security risks arising from execution of a potentially malicious application on a computer system.

In some embodiments, the application-specific access privilege system 120 can use permissions based on a class of applications rather than information about a specific application. These permissions may define, for the class of applications, permissions applicable to any specific application in the class of applications. For example, permissions set for e-mail clients may allow or disallow access to files in a directory for any type of e-mail client (e.g., Outlook, Thunderbird, Eudora, webmail clients, etc.).

In some embodiments, permissions used by the application-specific access privilege system 120 can be set to allow an application 110 or a class of applications to access specific types of files in a directory. For example, for a graphics editing application or class of graphics editing applications, the permissions may allow these applications to access various types of graphics files (e.g., JPEG files, PNG files, SVG files, various raw file formats from digital imaging devices, etc.). When a graphics application attempts to access a file, the application-specific access privilege system 120 can determine whether a format of the file for which access is requested is included in a list of file formats that the graphics application is allowed to access. If the format of the requested file is included in the list of file formats in permission record, the application-specific access privilege system can allow the application to access the file; otherwise, the application-specific access privilege system can block the application from accessing the file.

In some embodiments, the application-specific access privilege system 120 can be used to access encrypted files stored in the file system 130. An encryption key associated with the application-specific access privilege system 120 can be used when applications write to directories in the file system 130, and a decryption key associated with the application-specific access privilege system 120 can be used when applications read files from directories in the file system 130. The encryption and decryption keys may be stored on an external device (e.g., a USB flash drive, a sentinel device, an identity card, etc.) that a user may be required to insert into a computer system in order to gain access to the computer system and the files stored thereon. Files may be decrypted upon access by an application holding a valid lease to a file or a directory in the file system 130 or otherwise having permission to access files in the directory. In some embodiments, decrypted files may be placed in a temporary directory, and the application 110 can access the file by accessing the decrypted file in the temporary directory. After the application 110 finishes using the file, the decrypted file can be deleted from the temporary directory. In some cases, where the decrypted file has been modified, the modified version of the file may be encrypted, and the encrypted modified version of file may replace the existing version of the file in the file system 130.

In some embodiments, permission records may be associated with different network locations so that applications and users are able to access certain directories while connected to trusted networks (e.g., a work network, a virtual private network, etc.) and are unable to access these directories while connected to untrusted networks. When an application requests access to a file stored on the file system 130, the application-specific access privilege system can identify the network to which the computer system is connected (e.g., by a subnet, a network name, the gateway to which the computer system is connected, etc.). Based on the identification of the network to which the computer system is connected and network information included in a permission record, the application can determine whether to allow or disallow access to the requested file. In some embodiments, permission records may be associated with geographic location information. For example, an application may be allowed to access files in a directory if location information from a positioning system (e.g., a satellite-based positioning system, such as NAVSTAR GPS or GLONASS) indicates that the computer system is being used in a specified geographic region, and the application may be blocked from accessing files if the computer system is being used outside of the specified geographic region. By using location information in addition to application and user information, the application-specific access privilege system can prevent applications from accessing sensitive files when the computer system on which the file is being accessed is connected to untrusted networks, which may provide further defense against exfiltration of data from the computer system and unauthorized or accidental sharing of sensitive documents.

The permission repository 140 generally provides a data store in which permission records are stored for use by the application-specific access privilege system 120. This data store may be, for example, a relational database, a non-relational database, a flat file store, or other data store in which permission records may be stored. In some embodiments, permission repository 140 may include current and historical permission records, which may allow for auditing of access privileges granted to applications executing on a computer system. Permission records may be moved to a historical permission portion of permission repository 140 when a lease expires, and currently applicable permission records may be stored in a current permission portion of permission repository 140. Generally, an initial permission record for a file may be created and stored in the repository when the file is created. Subsequent permission records may be created, for example, when a user needs to grant an application temporary access to a file. Subsequent permission records may be created in response to a graphical prompt displayed to a user when a user attempts to access a file or directory using the application 110 and the application-specific access privilege system 120 determines that the application 110 does not currently have permission to access a file or directory. In embodiments, subsequent permission records may also or alternatively be created manually through a graphical or command line tool (e.g., similar to the chmod command in *NIX systems).

Permission repository 140 may be created, updated, and maintained in various manners based on whether the permission repository 140 is managed by a single user (e.g., an administrator of a local machine) or by a network administrator (e.g., in an enterprise deployment). In a system in which permission repository is managed by a single user, permission repository 140 may be created as a vault in the file system 130 or as a resource fork that can be copied, with the associated files, to other storage devices. In such a case where the permission repository 140 is created as a resource fork, the permission repository 140 may allow for files to be managed on removable storage devices in the manner discussed above, and the permission repository 140 may be synchronized each time the removable storage devices are connected with the local machine. In an enterprise deployment where permissions are managed by a network administrator across a plurality of computing devices, permission repository 140 may be made accessible to each machine that a user owning files in the enterprise deployment has access to. For example, permission repository 140 may be a centralized system that provides the latest copy of the permission repository 140 to a local machine when a user logs into the local machine. When the user logs out of the local machine, updates to permission records in the copy of the permission repository on the local machine may be persisted to permission repository 140 (e.g., through a blockchain or a versioning system) such that the updated permission records are provided to the local machine (or a different local machine in the enterprise deployment) when the user next logs in.

While the above discussion refers to using information about the directory in which a file is located to determine whether an application is allowed to perform a file operation, it should be recognized that permissions may be set on more or less granular levels. For example, permissions may be set based on a parent directory (e.g., recursively, such that child directories inherit the permissions set for the parent directory), based on specific types of files (e.g., different permissions for word processing documents, spreadsheets, presentations, etc.), or based on specific files.

Figure 2:
FIG. 2 illustrates example application-specific permissions for accessing files on a file system, according to one embodiment described herein.

FIG. 2 illustrates example application-specific permissions 200 for accessing files on a file system. As illustrated, the application-specific permissions 200 may include a plurality of permission records 210, 220, 230, 240 (hereinafter collectively referred to as "permission records 210-240"). Each permission record may identify a file system node for which a record is applicable, a user associated with the record, an application or class of applications associated with the record, lease information, access permissions, and/or an indication of whether the permissions are set to allow or deny access.

Permission record 210, as illustrated, is associated with the directory "/Users/Jeremy/images", the user "Jeremy", and the application "Photoshop". The lease information included in the permission record 210 indicates that access to files in the directory "/Users/Jeremy/images" by the user "Jeremy" using the application "Photoshop" is allowed until Sep. 2, 2020 and that the user has unlimited access to the files in the directory "/Users/Jeremy/images" using the application "Photoshop" until the lease expires, as indicated by the asterisk in the remaining accesses column. While the lease information illustrated in permission record 210 indicates a day on which the lease expires, it should be recognized that the lease expiry information may be set to any level of time granularity. While the lease illustrated in permission record 210 is active, the user "Jeremy" is allowed read/write access to the files in the directory using the application "Photoshop".

Permission record 220 illustrates a permission record that denies access to a user of a class of applications to files in a specified directory. As illustrated, permission record 220 applies to attempts to access the directory "/Users/Kenny/images" by the user "Jeremy" using an application in the class of photo applications. The class of photo applications may be defined, for example, a priori according to a list of known applications in the class of applications or as a list of applications compiled by a system administrator or user. When the user attempts to access files in the "/Users/Kenny/images" directory using a photo application, the application-specific access privilege system can determine that the user is not allowed to access these files and can block the request.

Permission record 230 illustrates a permission record that allows a user to access files in a specified directory until an expiration date or a maximum number of access attempts have been performed by an application. As illustrated, the user "Jeremy" is allowed to access files in the "/Users/Jeremy/documents" directory using the application "Word" either until the Sep. 15, 2019 expiry date of the lease or until the number of remaining accesses reaches zero (i.e., as illustrated, for another 25 times). When the user attempts to access files in the "/Users/Jeremy/documents" directory, an application-specific access privilege system can decrement the number of remaining accesses until the number of remaining accesses is zero. Once the number of remaining accesses in the privilege record reaches zero, the user "Jeremy" may be blocked from using the application "Word" to access files in the "/Users/Jeremy/documents" directory (though, as noted above, a new lease may be granted to allow the user "Jeremy" to continue to access files in the "/Users/Jeremy/documents" directory).

Permission record 240 illustrates a permission record that denies access by a class of applications to files in a specified directory. As illustrated, permission record is associated with Email applications, all users (as indicated by the "*" character, which indicates all users when used in the user column of the permission record), and the directory "/Corp/FinancialDocuments", and any manner of file access (as indicated by the "*" character, which indicates read, write, and any other types of file access when used in the read/write column of the permission record). When any user attempts to use an email client application to access files in the "/Corp/FinancialDocuments" directory, the application-specific access privilege system can block the application from accessing these files. In some embodiments, a user may be granted, in another permission record, temporary access to these files. In such a case, a more granular permission record (e.g., a permission record associated with a specific user or group of users) may override a more broadly applicable permission record until the more granular permission record expires.

In some embodiments, rules may be established for files or directories as such files or directories are created. Generally, a default rule established upon creation time may be that the user creating the file or directory (e.g., the "owner" of the file or directory) can access the file and that other users cannot access the file. The application-specific permissions 200 may subsequently be augmented with additional permission records which may override the default records created when the file or directory is created. In another embodiment, default rules may exist a priori to deny access to files and directories in a file system, and any permission record established in application-specific permissions 200 may override the default rule. Generally, where application-specific permissions 200 include both allow and deny rules, each rule may be associated with a priority level indicating which rules take precedence. The priority level may be associated, for example, with an index of the permission record associated with a rule in application-specific permissions 200 or with an explicit prioritization level assigned to the rule when the rule is created or modified. A sandbox or other testing environment may be implemented by the file system in order to allow users to test permission records and the interactions between such permission records before deploying permission records to a live (production) environment.

Figure 3:
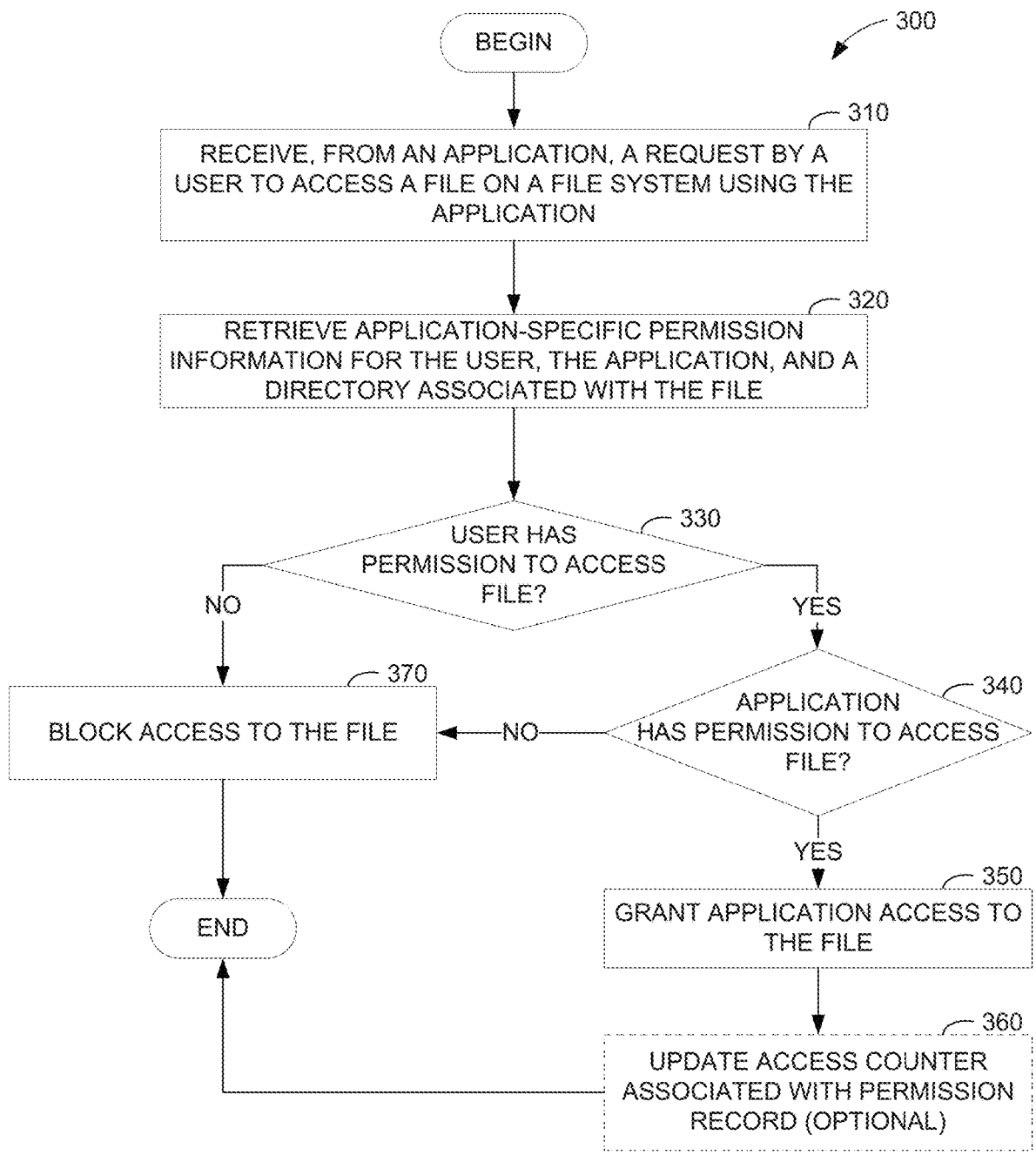
FIG. 3 illustrates example operations for controlling access to files on a file system using application-specific permissions, according to one embodiment described herein.

FIG. 3 illustrates example operations 300 that may be performed by an application-specific access privilege system executing on a computer to manage access to files in a file system using application-specific permissions. Operations 300 may be performed on a client device (e.g., a desktop computer, a laptop computer, a tablet, a smartphone, etc.), remote access systems, cloud compute systems that allow users to remotely access files, and the like.

As illustrated, operations 300 begin at block 310, where an application-specific access privilege system receives, from an application, a request by a user to access a file on a file system using the application. The request may include, for example, a user identifier, an application identifier, a timestamp, and/or other information that may be used in processing the request. The application identifier may be, for example, the name of an executable file, the name of a process, a signature associated with the application (e.g., an MD5 hash of the executable file, a globally unique identifier associated with the application, etc.), or other information that uniquely identifies the application At block 320, the application-specific access privilege system retrieves, from a repository, application-specific permission information for the user, the application, and a directory associated with the file. To retrieve the application-specific permission information, the application-specific access privilege system can search the repository for permission records using the user identifier and application identifier included in the request, using a wildcard or group name instead of the user identifier, and/or using a wildcard or application class name instead of the application identifier. In some embodiments, where multiple permission records are retrieved, the application-specific access privilege system can select the privilege record including the most specific parameters.

At block 330, the application-specific access privilege system determines whether the user has permission to access the file based on privilege information in the retrieved application-specific permission information. If the user has permission to access the file, operations 300 may proceed to block 340, where the application-specific access privilege system determines whether the application has permission to access the file. Generally, the application-specific access privilege system can determine that the application has permission to access the file if the retrieved application-specific permission information indicates that the application is allowed to access the file or if a user temporarily grants the application a lease to the directory in which the file is located. Various techniques for determining whether the application has permission to access the file are described in greater detail in FIGS. 4 and 5 below.

If the application has permission to access the file, then at block 350, the application-specific access privilege system grants the application access to the file. In granting the application access to the file, the application-specific access privilege system can pass a file handle or other information about the file to the application such that the application is allowed to perform operations with respect to the file on the file system. In some embodiments, where the file system is encrypted, the application-specific access privilege system can decrypt the file using a cryptographic key, store the decrypted file in a temporary location, and grant the application access to the decrypted file in the temporary location.

In some embodiments, operations 300 may proceed to block 360, where the application-specific access privilege system updates an access counter associated with the permission record. The application-specific access privilege system may update the access counter associated with the permission record, for example, when a permission record includes a number of allowed file accesses or file access attempts. In some embodiments, the application-specific access privilege system may update access counters associated with permission records to allow for historical tracking of file accesses and/or access attempts in a computing system. The access counter may, for example, be a remaining number of file accesses or access attempts recorded in the permission record. In this example, updating the access counter may include decrementing the remaining number of file accesses or access attempts recorded in the permission record, thereby updating the permission record to indicate the number of remaining file accesses or access attempts for the user and the application. In some examples, the access counter may be independently maintained by the application-specific access privilege system outside of the permission records and may be incremented as a user and application accesses the file.

If, at block 330, the application-specific access privilege system determines that the user does not have permission to access the file or, at block 340, the application-specific access privilege system determines that the application does not have permission to access the file, operations 300 may proceed to block 370. At block 370, the application-specific access privilege system blocks access to the file. In blocking access to the file, the application-specific access privilege system can generate an error message indicating that permission was denied and return the error message to the application for handling.

Figure 4:
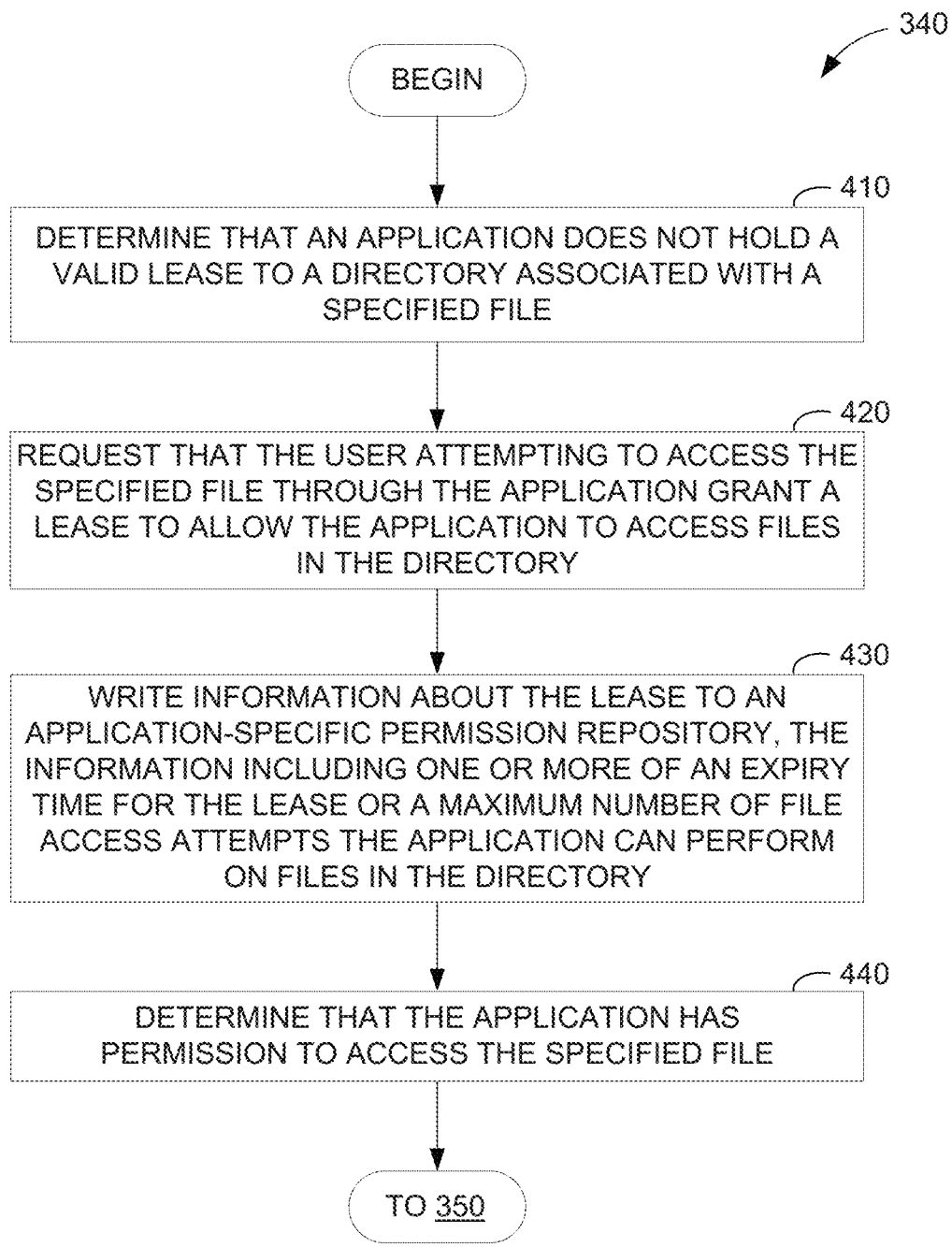
FIG. 4 illustrates example operations for generating a lease granting application-specific permission to access files in a directory when an application does not already have permission to access files in the directory, according to one embodiment described herein.

FIG. 4 illustrates further details of block 340 for determining whether an application has permission to access a file. The operations illustrated in FIG. 4 may be performed when the application does not currently hold a lease granting application-specific permission to access files in a directory or otherwise has permission to access files in the directory.

As illustrated, operations 340 may begin at block 410, where the application-specific access privilege system determines that the application attempting to access a specified file does not hold a valid lease to a directory associated with the specified file. Generally, the application-specific access privilege system can determine that the application does not hold a valid lease to the directory associated with the specified file if permission records for the three-tuple of {directory, user, application} includes a lease expiry time that is prior to the current time or a number of remaining accesses to files in the directory is zero.

At block 420, the application-specific access privilege system requests that the user attempting to access the specified file through the application grant a lease to allow the application to access files in the directory. The application-specific access privilege system can, for example, generate a prompt requesting that a user grant or deny a lease. In some embodiments, the prompt may be generated and directed to the user attempting to access the specified file through the application. In some embodiments, the prompt may be generated and directed to another user, such as the owner of a file or directory, a user who sent a link to a file, or the like. In some embodiments, such as an enterprise deployment, the application-specific access privilege system can proceed as discussed above where the local system is connected with an enterprise server managing the application-specific privileges. In another example, where the local system is disconnected from the enterprise server, the application-specific access privilege system can buffer the attempt to access the file until a connection with the enterprise server is reestablished, can allow a new permission record to be generated (for example, where the user owns the file the application is attempting to access), or take other actions it may deem appropriate in response to the request to access the specified file. Where new records are created locally, these new records can be persisted across different copies of the application-specific privilege repository when the local machine re-establishes a connection with the enterprise server in order to persist the new records across each copy of the application-specific privileges used in the enterprise system. If the user denies the lease, no further action need be taken. Otherwise, the application-specific access privilege system can request that the user provide parameters defining the lease. These parameters may include, for example, an expiry date or time for the lease, an amount of time that the lease is valid, a number of accesses allowed during the time that the lease is valid, and the like.

At block 430, the application-specific access privilege system writes information about the lease to an application-specific permission system. As discussed, the lease may include one or more of an expiry time for the lease or a maximum number of file access attempts the application can perform on files in the directory.

At block 440, the system determines that the application has permission to access the specified file based on the grant of a lease to the application. Subsequently, operations may proceed to block 350 illustrated in FIG. 3 and discussed above.

Figure 5:
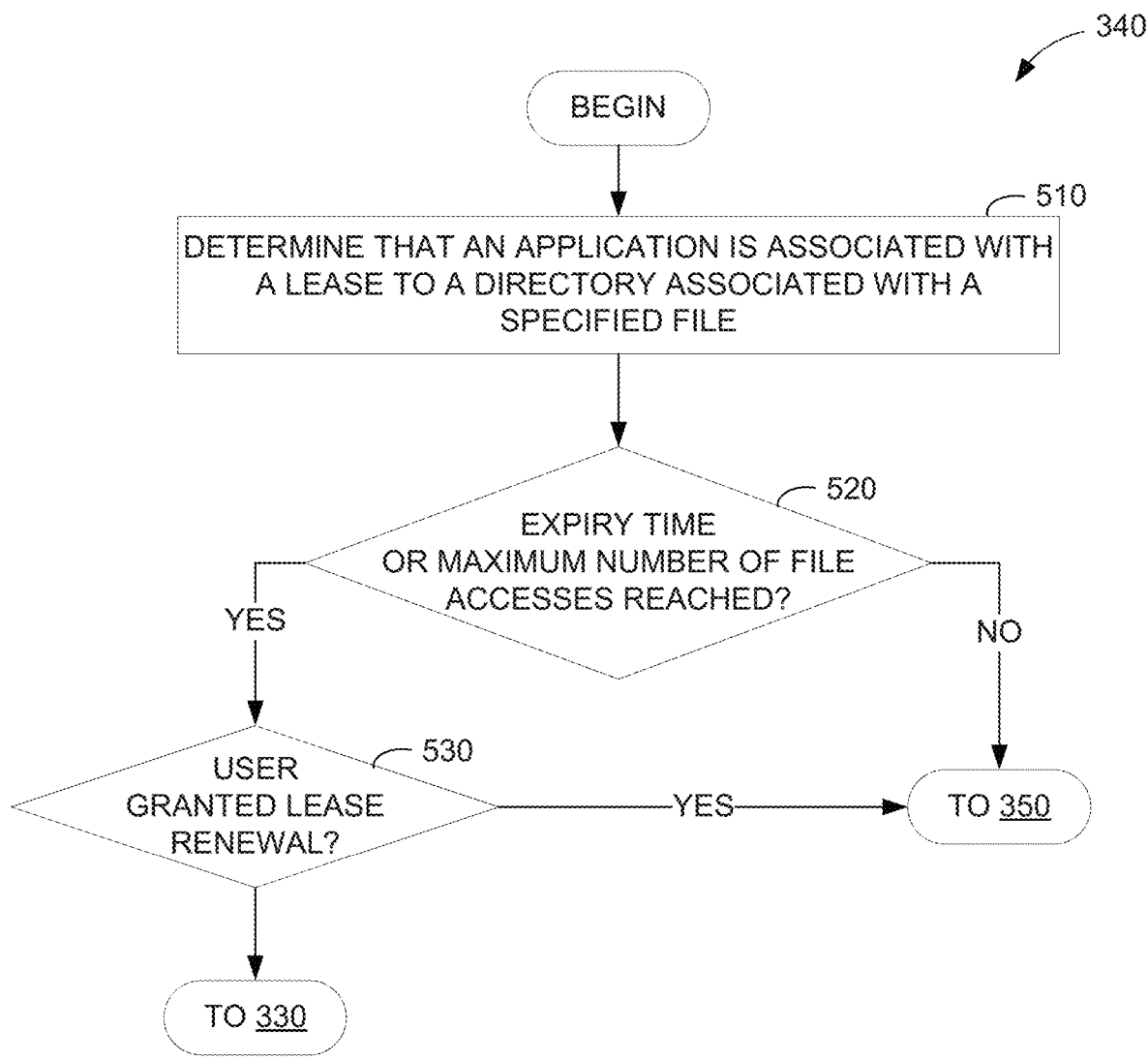
FIG. 5 illustrates example operations for controlling access to files on a file system using lease expiry information in application-specific permissions, according to one embodiment described herein.

FIG. 5 illustrates further details of block 340 for determining whether an application has permission to access a file . . . . Generally, as opposed to the operations illustrated in FIG. 4 which may be performed when no lease exists for the application to access files in the directory, the operations illustrated in FIG. 5 may be performed when the application holds a current lease granting permission to access the file.

As illustrated, operations 340 may begin at block 510, where the application-specific access privilege system determines that an application is associated with a lease to a directory associated with a specified file. The application-specific access privilege system can determine that the application is associated with a lease to a directory associated with a specified file if a privilege record including expiry information is retrieved from a permission store.

At block 520, the application-specific access privilege system determines whether the lease is valid based on whether an expiry time or a maximum number of file accesses by the application has been reached.

If, at block 520, the application-specific access privilege system determines that the expiry time or the maximum number of file accesses by the application has not been reached, the application-specific access privilege system can determine that the lease is still valid. Operations 340 may thus proceed to block 350 illustrated in FIG. 3, where, as discussed above, the application-specific access privilege system grants the application access to the specified file.

If, at block 520, however, the application-specific access privilege system determines that the expiry time or the maximum number of file accesses by the application has been reached, operations 340 may proceed to block 530. At block 530, the application-specific access privilege system can determine whether the user has granted a lease renewal for the application. In determining whether the user has granted a lease renewal for the application, the application-specific access privilege system can generate a prompt requesting that the user grant or deny an extension to the lease. If the user grants the extension to the lease, the application-specific access privilege system can request that the user provide parameters defining the lease.

If, at block 530, the user did grant a lease renewal, the application can be granted access to the file. Operations 340 may thus proceed to block 350 illustrated in FIG. 3, discussed above, in which the application-specific access privilege system grants the application access to the file. Otherwise, operations 340 proceed to block 370 illustrated in FIG. 3, discussed above, where the application-specific access privilege system blocks the application from accessing the file.

Figure 6:
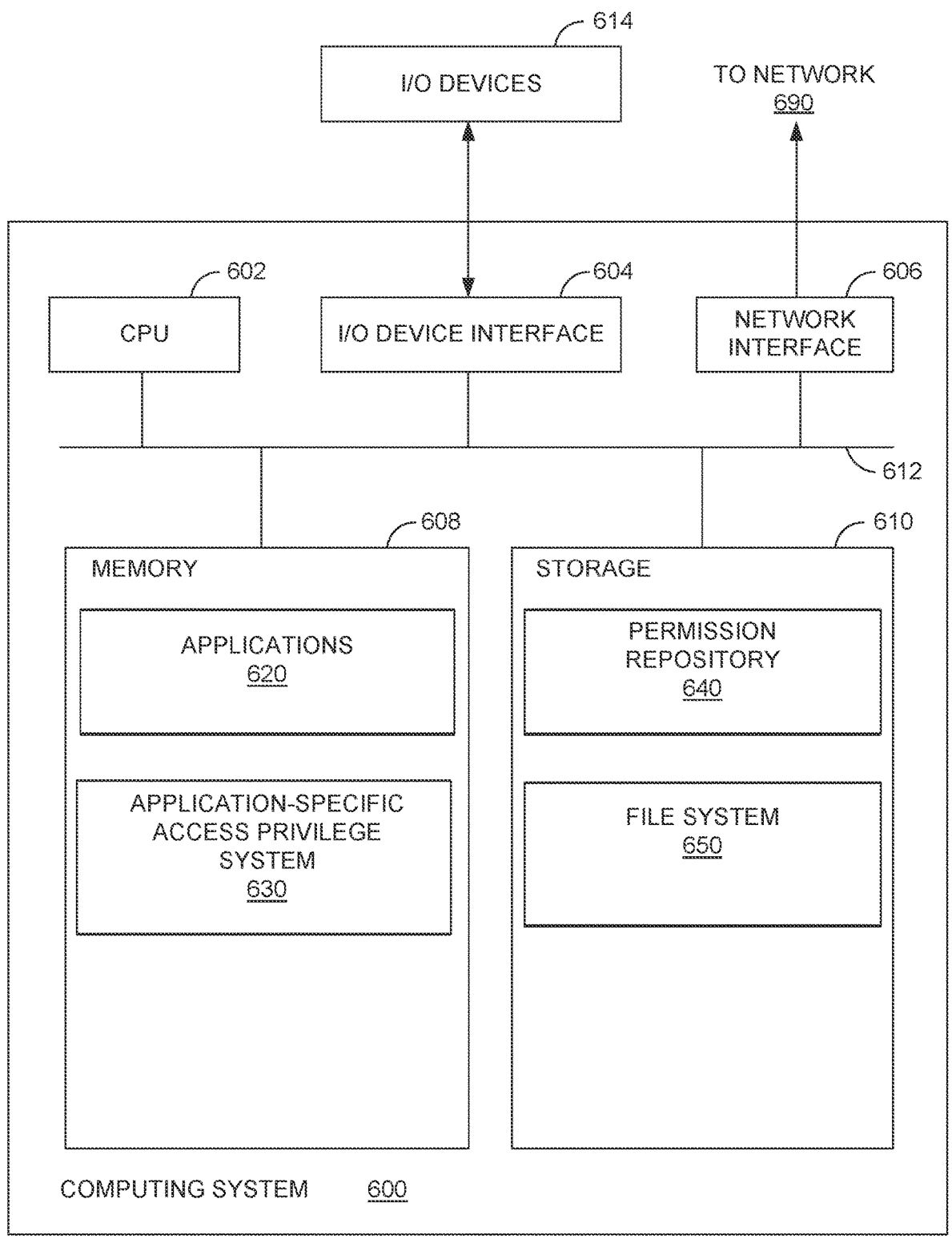
FIG. 6 illustrates an example system for using application-specific access permissions to control access to files on a file system, according to one embodiment described herein.

FIG. 6 illustrates an example computer system 600 that uses application-specific permissions to allow or disallow access to files on the computer system. System 600 may be representative, for example, of a computing device that can host the file access pipeline 100 illustrated in FIG. 1.

As illustrated, computing system 600 includes a central processing unit (CPU) 602, one or more I/O device interfaces 604 that may allow for the connection of various I/O devices 614 (e.g., keyboards, displays, mouse devices, pen input, imaging devices, etc.) to the computing system 600, network interface 606 through which computing system 600 is connected to network 690 (which may be a local network, an intranet, the internet, or any other group of computing devices communicatively connected to each other), a memory 608, storage 610, and an interconnect 612.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610.

CPU 602 is included to be representative of a single CPU, multiple CPUs, a single CPU having multiple processing cores, and the like. In some embodiments, CPU 602 may include or outsource work to one or more specialized processing units, such as a graphics processing unit (GPU), tensor processing unit (TPU), neural processing unit (NPU), or other processing units that are capable of performing operations in parallel.

Memory 608 is representative of a volatile memory, such as a random access memory, or a nonvolatile memory, such as nonvolatile random access memory, phase change random access memory, or the like. As illustrated, memory 608 includes applications 620 and an application-specific access privilege system 630. Applications 620 are generally representative of various user-space applications that execute on a computing system and access data on the file system 650 of the computing system 600. The application-specific access privilege system 630 receives requests to access data on the file system 650 (i.e., requests to read data from or write data to the file system 650) from the applications 620 and uses user, application, and file information to determine whether to grant the applications 620 access to the requested data on the file system 650. The application-specific access privilege system 630 can retrieve permission records from permission repository 640 when an application attempts to access files on the file system 650. If a permission record does not exist in the permission repository 640, the application-specific access privilege system 630 can prompt a user to grant a lease to the application to allow the application to temporarily access files on the file system 650. Otherwise, the application-specific access privilege system 630 can determine whether the permission record is valid and, if so, if the application and the user has permission to access files in a specified directory. Based on the determination of whether the permission record is valid, the application-specific access privilege system 630 can allow access to the specified directory if the permission record indicates that the application and the user has permission to perform operations on the specified directory and can block access to the specified directory if the permission record indicates that the application and the user does not have permission to perform operations on the specified directory.

Storage 610 is representative of a non-volatile memory, such as a disk drive, solid state drive, or a collection of storage devices distributed across multiple storage systems. Although shown as a single unit, the storage 610 may be a combination of fixed and/or removable storage devices, such as fixed disc drives, removable memory cards or optical storage, network attached storage (NAS), or a storage area-network (SAN). As illustrated, storage 610 includes a permission repository 640 and a file system 650. Permission repository 640 generally provides a repository in which permission records are stored for use by the application-specific access privilege system 630. These permission records may include, for example, at least a three-tuple of {application, user, directory} as a key, permission record expiration information, and read/write/execute permission information. The file system 650 generally represents a system in which files are stored on a computing system. File system 650 may allow applications 620 to access files on the computing system 600 and/or other computing systems via network interface 606, subject to restrictions defined by permission records in the permission repository 640 and application thereof by the application-specific access privilege system 630.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method to implement application-specific permissions using an interceptor, the method comprising:
   receiving, by the interceptor, a request by a user to access a specified file on a file system through an application, the file system comprising a computer file system;
   retrieving, from a permission repository, a permission record based on information about the application, the user, and the specified file;
   determining whether the user has permission to access a directory in the file system in which the specified file is located;
   determining, by the interceptor and based on the permission record, whether the application has permission to access the specified file comprising identifying a type of the specified file, and determining whether the application is compatible with the type of the specified file;
   upon determining that the application does not have permission to access the specified file comprising determining that the application is not compatible with the type of the specified file, blocking the application from accessing the specified file; and
   upon determining that the user has permission to access the directory in which the specified file is located and determining that the application has permission to access the specified file comprising determining that the application is compatible with the type of the specified file, retrieving the specified file from the directory and granting the application access to the specified file.

2. The method of claim 1, wherein determining whether the application has permission to access the specified file further comprises determining whether the application has permission to access files in the directory by determining that the permission record indicates that the application has a valid lease to the directory.

3. The method of claim 2, wherein determining that the application has the valid lease to the directory comprises: determining that a current time is before a lease expiration time specified in the permission record.

4. The method of claim 2, wherein determining that the application has the valid lease to the directory comprises: determining that a number of times over a time period during which the application is allowed to access files in the directory is less than a number of times over the time period that the application has accessed files in the directory.

5. The method of claim 4, further comprising:
based on a determination that the application has the valid lease to the directory, incrementing the number of times over the time period that the application has accessed files in the directory.

6. The method of claim 2, further comprising:
upon determining that the application does not hold the valid lease to the directory, requesting, from the user, a grant of a lease to the application to access the directory; and
upon receiving an indication that the application is granted the lease to access the directory: granting the application access to the specified file in the directory, and writing information about the granted lease to the permission repository.

7. The method of claim 1, wherein the permission record comprises a cryptographic key for encrypting and decrypting files in the directory, and wherein granting the application access to the specified file comprises granting the application access to a decrypted version of the specified file in a temporary location.

8. The method of claim 7, further comprising:
receiving, from the application, a request to save a modified version of the specified file;
saving the modified version of the specified file in the temporary location;
encrypting the modified version of the specified file using the cryptographic key;
replacing the specified file in the directory with the encrypted modified version of the specified file; and
removing the decrypted version of the specified file and the modified version of the specified file from the temporary location.

9. The method of claim 1, wherein permissions in the permission repository specify permissions based on a location of a computer such that the application is allowed to access files in the directory when the computer is located in a trusted location and disallowed from accessing files in the permission repository when the computer is located in an untrusted location.

10. The method of claim 9, wherein the application is executed locally on the computer.

11. The method of claim 1, wherein the permission record specifies permissions to access files in the directory based on a class of the application.

12. A system to implement application-specific permissions using an interceptor, the system comprising:
a processor; and
a memory having instructions stored thereon which, when executed by the processor, performs an operation for managing access to files on a computer file system, the operation comprising:
receiving, by the interceptor, a request by a user to access a specified file on a file system through an application, the file system comprising a computer file system,
retrieving, from a permission repository, a permission record based on information about the application, the user, and the specified file,
determining whether the user has permission to access a directory in the file system in which the specified file is located,
determining, by the interceptor and based on the permission record, whether the application has permission to access the specified file comprising identifying a type of the specified file, and determining whether the application is compatible with the type of the specified file,
upon determining that the application does not have permission to access the specified file comprising determining that the application is not compatible with the type of the specified file, blocking the application from accessing the specified file, and
upon determining that the user has permission to access the directory in which the specified file is located and determining that application has permission to access the specified file comprising determining that the application is compatible with the type of the specified file, retrieving the specified file from the directory and granting the application access to the specified file.

13. The system of claim 12, wherein determining whether the application has permission to access the specified file further comprises determining whether the application has permission to access files in the directory by determining that the permission record indicates that the application has a valid lease to the directory.

14. The system of claim 13, wherein determining that the application has the valid lease to the directory comprises one or more of:
determining that a current time is before a lease expiration time specified in the permission record; or
determining that a number of times over a time period during which the application is allowed to access files in the directory is less than a number of times over the time period that the application has accessed files in the directory.

15. The system of claim 14, wherein the operation further comprises:
based on a determination that the application has the valid lease to the directory, incrementing the number of times over the time period that the application has accessed files in the directory.

16. The system of claim 13, wherein the operation further comprises:
upon determining that the application does not hold the valid lease to the directory, requesting, from the user, a grant of a lease to the application to access the directory; and
upon receiving an indication that the application is granted a lease to access the directory:
granting the application access to the specified file in the directory, and
writing information about the granted lease to the permission repository.

17. The system of claim 12, wherein the permission record comprises a cryptographic key for encrypting and decrypting files in the directory, and wherein granting the application access to the specified file comprises granting the application access to a decrypted version of the specified file in a temporary location.

18. The system of claim 17, wherein the operation further comprises:
receiving, from the application, a request to save a modified version of the specified file;
saving the modified version of the specified file in the temporary location;
encrypting the modified version of the specified file using the cryptographic key;
replacing the specified file in the directory with the encrypted modified version of the specified file; and
removing the decrypted version of the specified file and the modified version of the specified file from the temporary location.

19. One or more non-transitory computer-readable media having instructions stored thereon which, when executed by one or more processors, performs an operation to implement application-specific permissions using an interceptor, the operation comprising:
receiving, by the interceptor, a request by a user to access a specified file on a file system through an application, the file system comprising a computer file system;
retrieving, from a permission repository, a permission record based on information about the application, the user, and the specified file;
determining whether the user has permission to access a directory in the file system in which the specified file is located;
determining, by the interceptor and based on the permission record, whether the application has permission to access the specified file comprising identifying a type of the specified file, and determining whether the application is compatible with the type of the specified file;
upon determining that the application does not have permission to access the specified file comprising determining that the application is not compatible with the type of the specified file, blocking the application from accessing the specified file; and
upon determining that the user has permission to access the directory in the file system in which the specified file is located and determining that the application has permission to access the specified file comprising determining that the application is compatible with the type of the specified file, retrieving the specified file from the directory and granting the application access to the specified file.

20. The method of claim 1, wherein the interceptor comprises a virtual file system layer.

* * * * *